United States Patent [19]
Fryc

[11] Patent Number: 5,634,763
[45] Date of Patent: Jun. 3, 1997

US005634763A

[54] PRESENTATION OF PARTS

[75] Inventor: Oldrich Fryc, Renton, Wash.

[73] Assignee: The Boeing Company, Seattle, Wash.

[21] Appl. No.: 269,499

[22] Filed: Jul. 1, 1994

[51] Int. Cl.$^6$ ................................................. B65G 25/00
[52] U.S. Cl. ......................... 414/751; 29/283; 198/345.1; 294/119.1
[58] Field of Search .................... 414/749, 751, 414/782, 783, 784, 786; 269/216; 198/345.1; 294/119.1, 88, 111, 68.23; 29/466, 281.1, 281.5, 759, 766, 283

[56] References Cited

U.S. PATENT DOCUMENTS

| | | | |
|---|---|---|---|
| 2,615,748 | 10/1952 | Olson | 294/119.1 |
| 3,472,401 | 10/1969 | Scaperotto | 294/119.1 X |
| 3,540,770 | 11/1970 | Mitchell | 294/111 |
| 4,416,577 | 11/1983 | Inaba et al. | 414/736 X |
| 4,821,393 | 4/1989 | Spigarelli | 29/759 X |
| 4,898,416 | 2/1990 | Hubbard et al. | 294/119.1 |
| 5,066,189 | 11/1991 | Shell | 294/111 X |

FOREIGN PATENT DOCUMENTS

| | | | |
|---|---|---|---|
| 2640605 | 6/1990 | France | 294/119.1 |
| 850534 | 7/1981 | U.S.S.R. | 414/751 |

*Primary Examiner*—Donald W. Underwood
*Attorney, Agent, or Firm*—Lawrence W. Nelson; J. Michael Neary

[57] ABSTRACT

A method and apparatus for accurately positioning parts precisely in a predetermined location, including a frame having a part receiving zone on which said parts are placed for movement to the predetermined location. Two positioners are mounted on linear bearings connected to the frame and are connected to a cable for opposed motion toward and away from the part on the receiving zone under control of the cable. The cable is trained around a four pulleys mounted on said frame and connected to a cable cylinder. The cable passes axially through cylinder and connects to a piston on the centerline of the piston. Movement of the piston in one direction in the cylinder is operative to move the cable and the attached positioners toward each other to center the part. Movement of the piston in the opposite direction moves the positioners away from each other to release the part.

12 Claims, 6 Drawing Sheets

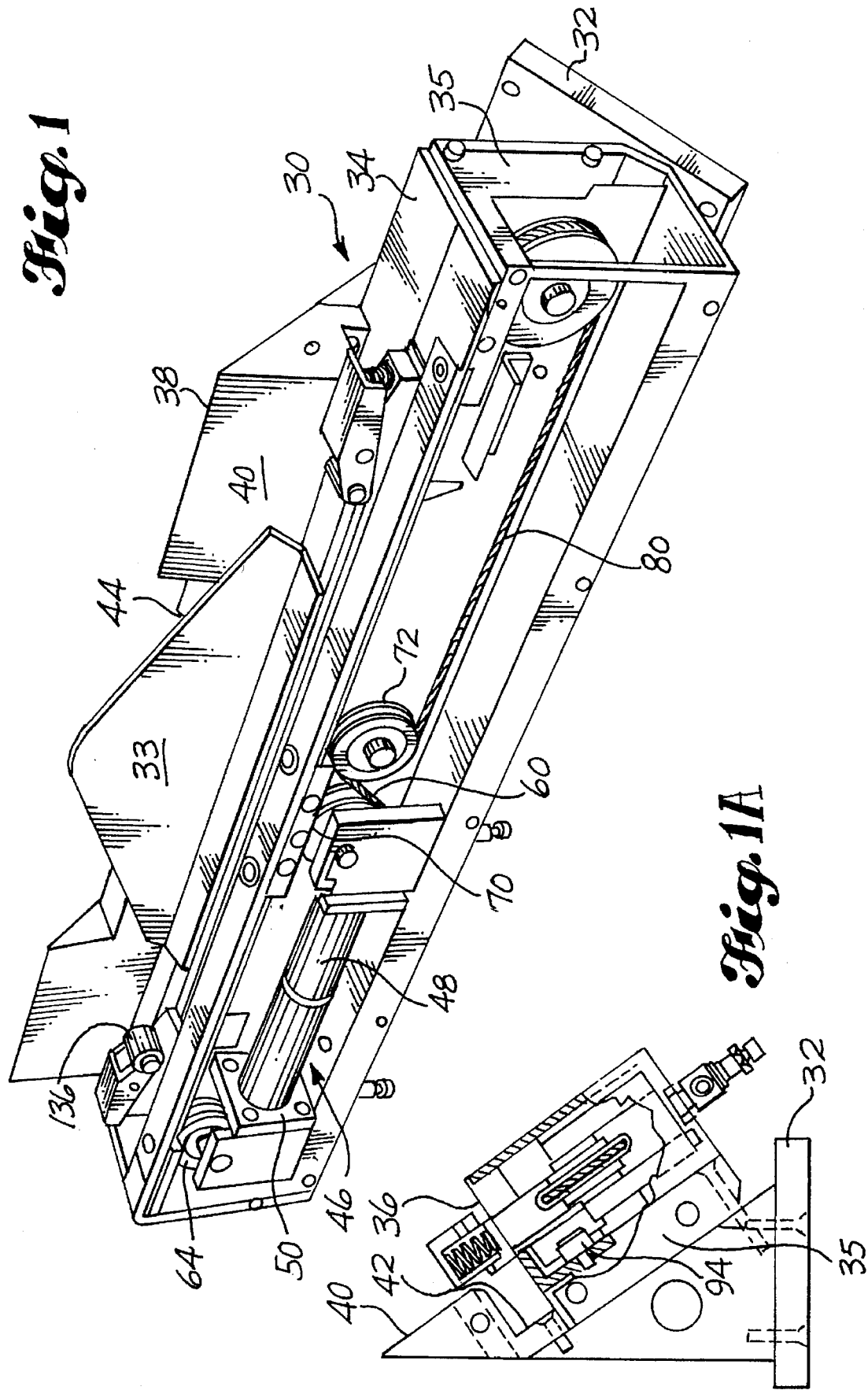

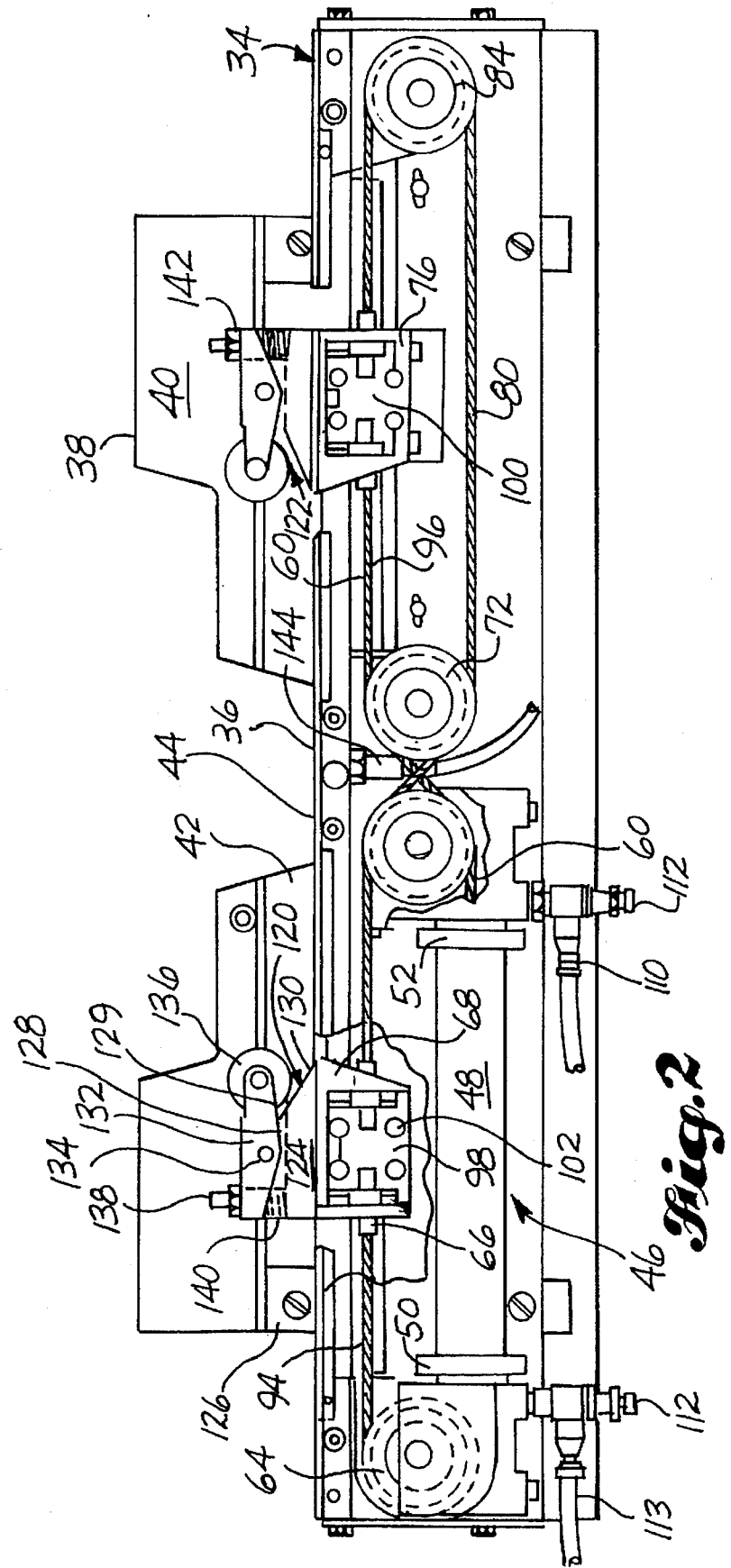

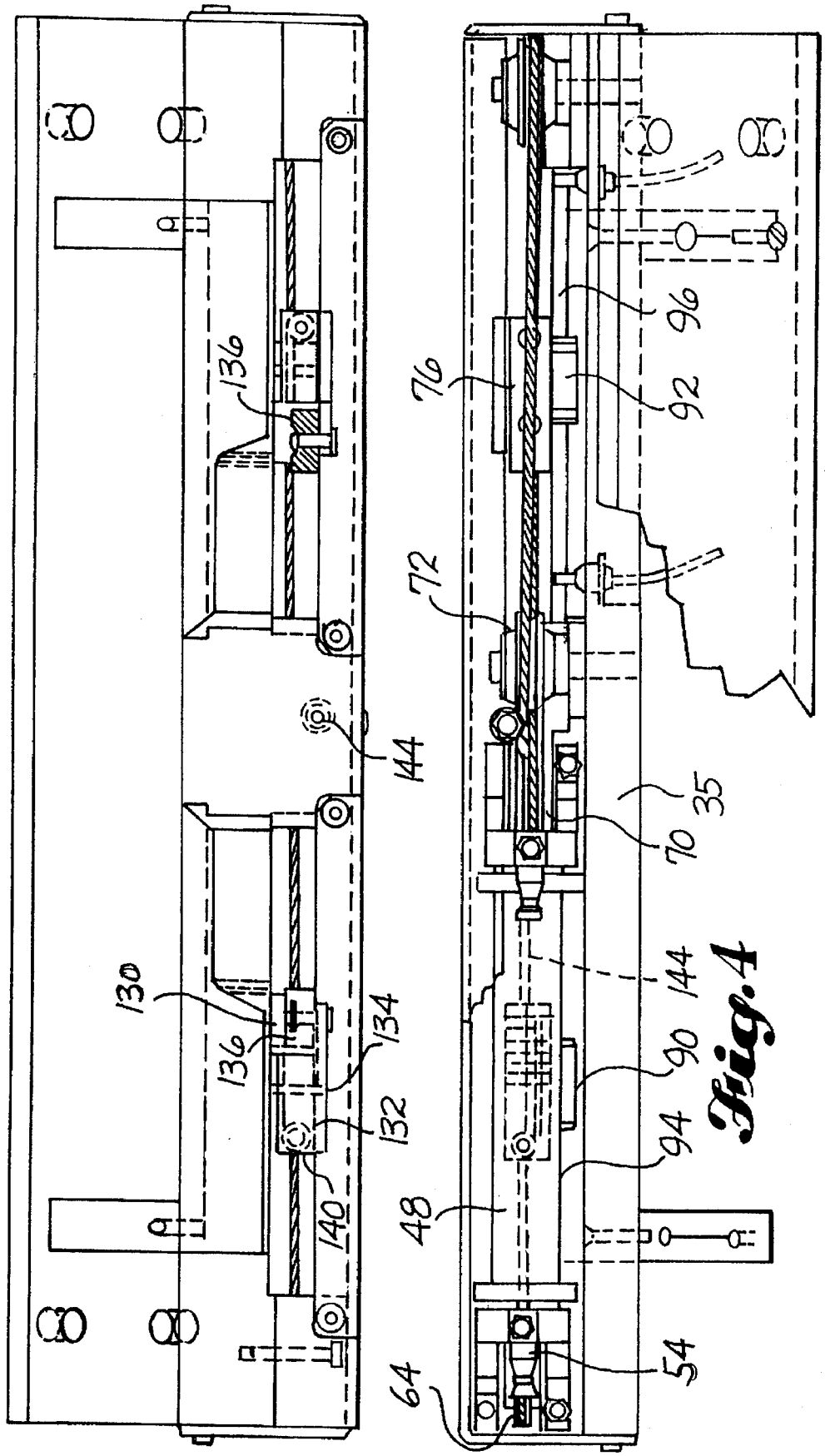

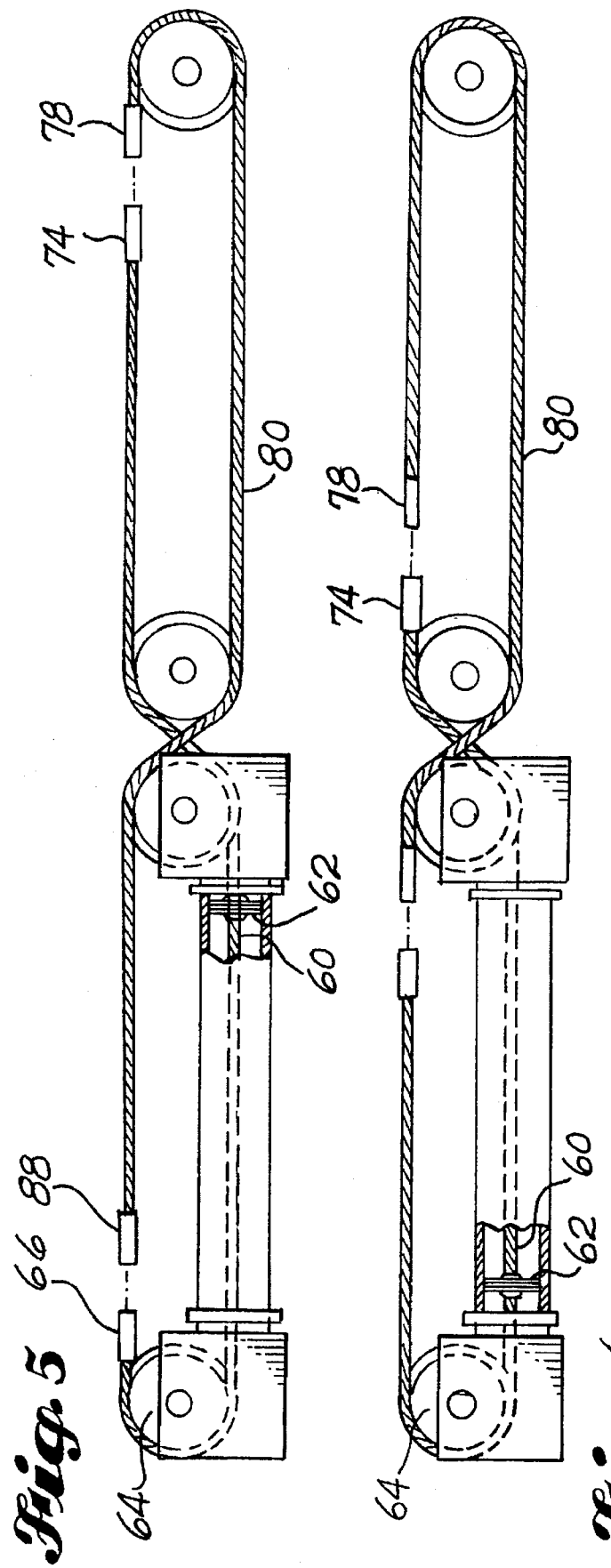

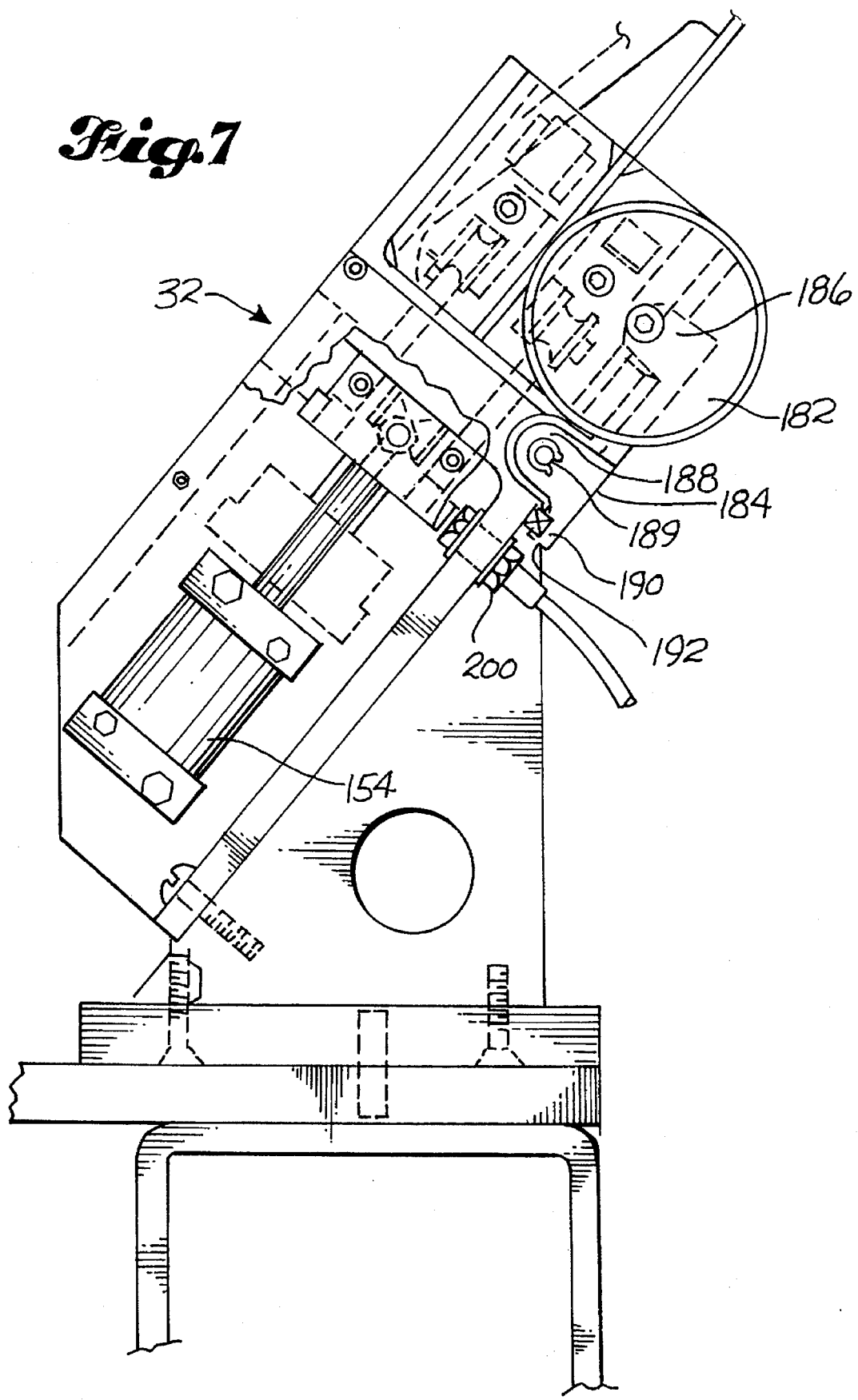

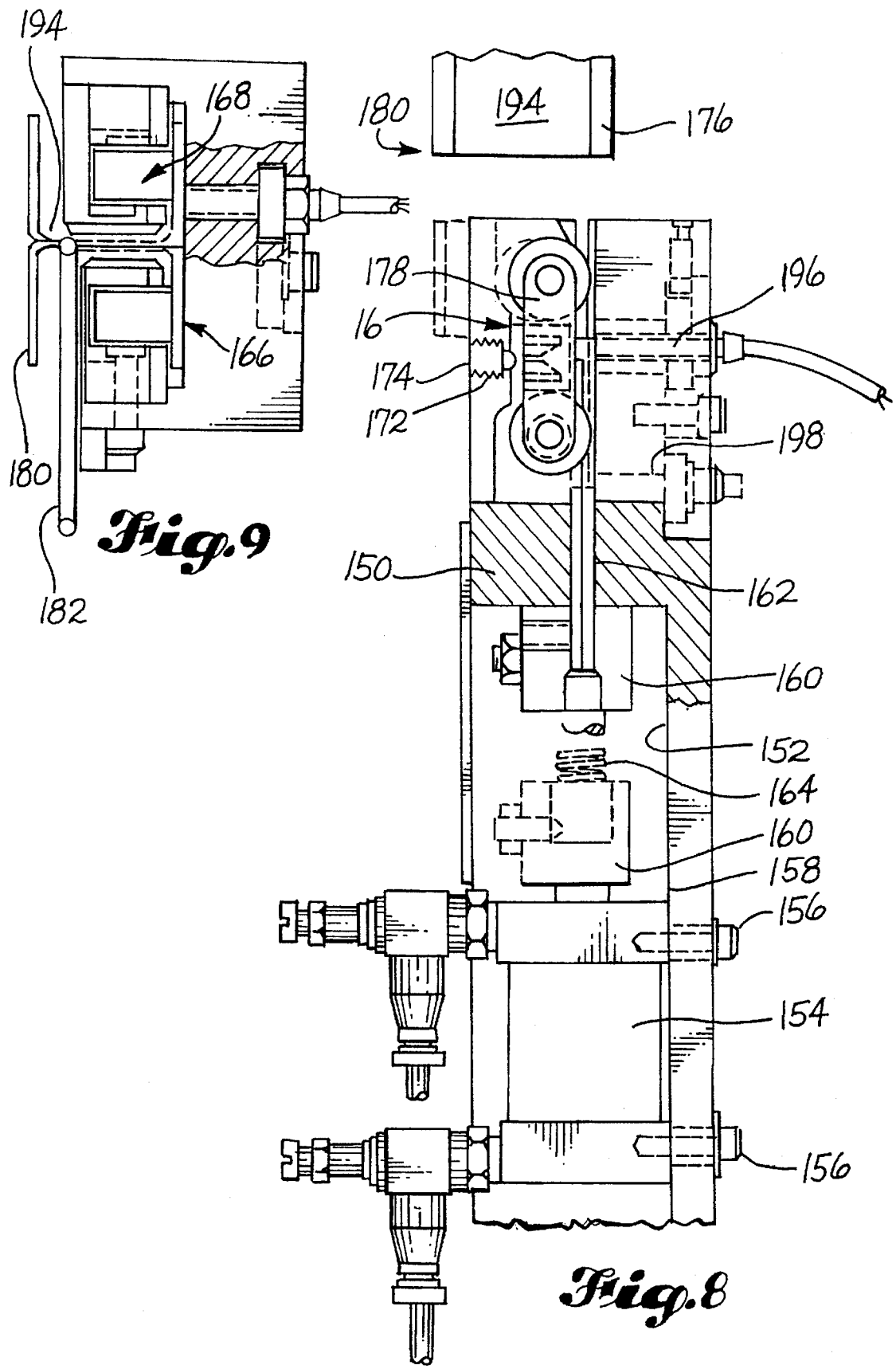

PRESENTATION OF PARTS

This invention pertains to a method and apparatus for accurately positioning the parts in a predetermined location and orientation for pickup or other operations by a robot end effector.

BACKGROUND OF THE INVENTION

Modern production equipment and techniques have been developed in the last decade for performing manufacturing operations on production pads and assemblies that are significantly more accurate than the manual manufacturing techniques of the past. The primary goal is to reduce part variation and the secondary goal is to improve the performance and reduce the cost of the manufactured products. A substantial influence on the quality and cost of the manufactured products in the past has been pad variation, the reduction of which reduces the costs of rework and improves fit and function of the product.

One particular version of such a modern manufacturing system known as "virtual tooling", requires accurate information regarding the location and orientation of pads which are to be processed by the automated production machinery. The various types of airplane parts such as shear ties and brackets are picked up by a robot end effector and positioned by the robot at the precise position on a panel at which they are to be fastened. While held in this position, one or more coordination holes are drilled through the pad and the panel to establish the position on the panel where those pads will eventually be fastened. At a later stage in the manufacturing, the panel is hung from a simple fixture and the part is positioned on the panel and fastened thereto by appropriate means such as rivets, bolts and/or sealant.

The location of the pad on the panel is extremely accurate because of the accuracy of the robot, but that accuracy is dependent on an accurate position of the part when it is picked up by the end effector. The end effector must grip the pad at a known position on the pad otherwise there could be significant variation from pad to pad if the end effector were to pick up the pads at different positions on the part. A pad positioning system for presenting the pads to the robot end effector at an accurate and predetermined location and orientation and space was therefore necessary element of this manufacturing system in order to obtain its full potential accuracy.

A part positioning system for use in an airplane factory must be designed ruggedly to withstand continuous rough use over long periods of time without failure or loss of accuracy. It must also be easily and accurately checked for calibration and easily recalibrated if out of adjustment. It should preferably be a simple, uncomplicated construction and be inexpensive to manufacture and use. Finally, it should be fast acting to avoid creating time lags in the production sequence, and be simple and safe to operate.

SUMMARY OF THE INVENTION

Accordingly, it is an object of this invention to provide a method and apparatus for accurately positioning and orienting pads in space for operations by robotic equipment. Another object of this invention is to provide a method and apparatus for presenting parts of multiple different configurations in a particular predetermine position and orientation for gripping by a robotically controlled end effector.

These and other objects of the invention are attained in a part presentation system having a frame with a part receiving zone on which parts are placed for positioning by a pair of opposed positioners mounted on the base at opposite sides of the part receiving zone. The positioners are connected to a cable trained around a set of pulleys in a FIG. 8 configuration for opposed movement toward and away from the part when the cable is moved by a piston to which the cable is attached in a cable cylinder. The cable runs axially through the cylinder and is connected to the center of the piston for exerting a balanced axial force on the cable.

DESCRIPTION OF THE DRAWINGS

The invention and its many attendant objects and advantages will become more clear upon reading the following detailed description of the preferred embodiment in conjunction with the following drawings, wherein FIG. 1 is a perspective view of a shear tie presentation module in accordance with this invention;

FIG. 1A is a side view of the structure shown in FIG. 1;

FIG. 2 is a front elevation of the parts presentation system shown in FIG. 1;

FIG. 3 is a top plan view of the parts presentation system shown in FIG. 1;

FIG. 4 is a bottom view of the structure shown in FIG. 3;

FIG. 5 is a schematic view of a the cable arrangement for the parts presentation system shown in FIG. 2, in the open position;

FIG. 6 is a schematic view of a the cable arrangement for the parts presentation system shown in FIG. 2, in the closed position;

FIG. 7 is a side elevation of a stringer clip presentation module disposed adjacent the shear tie presentation module shown in FIG. 1;

FIG. 8 is a front view, partly in section of the module shown in FIG. 7; and

FIG. 9 is an end view of the module shown in FIG. 7.

DESCRIPTION OF THE PREFERRED EMBODIMENT

Referring now to the drawings, wherein like reference characters designate identical or corresponding parts, and more particularly to FIG. 1 thereof, a parts presentation system is shown having a shear tie presentation module mounted at an angle on a horizontal base 32. The base 32 is mounted on top of a supporting structure (not shown) adjacent a second module for presentation of stringer clips, shown in FIGS. 7–9.

The shear tie presentation module 30 accepts "T" and "L" cross section shear ties and similar fairing brackets, referred to collectively herein as "parts" 33. Shear ties and fairing brackets are parts which are fastened to the inside and outside, respectively, of a airplane fuselage for structural attachment of other airplane structures. The shear tie presentation module 30 receives a part 33 and positions the part at a known and repeatable position and orientation in space for pickup by a robot end effector, such as the end effector shown in U.S. Pat. application Ser. No. 5,482,409, the disclosure of which is incorporated herein by reference. The end effector carries the part to a fuselage panel and holds the part very accurately against the panel at a position specified in the original product definition data in the central computer depository for such information. While the part is held against the panel, coordination holes are drilled through the part and the panel which are later used during the fastening operations for the part to the panel. After drilling, the part is then carried back to the presentation module and is deposited into a bin for retrieval and bagging by the operator for subsequent fastening operation.

The shear tie presentation module 30 includes a frame 34 on which are mounted the other elements of the module. The frame includes a solid, sturdy body 35 to which all the parts are connected. The upper part of the body 35 extends upward to form a rear wall 38, and a series of plate extensions 36 fastened to the body 35 on a plane at right angles to the rear wall 38 form a top plate 36 The rear wall has a upright face 40 which extends a right angle to the plane of the top plate 36. As shown in FIG. 1A, the top surface of the top plate 36 is oriented at an angle to the horizontal, and the face of the upright face 40 of the rear wall 38 is also at an angle to the vertical so that the intersection of the upright face 40 and the top surface of the top plate 36 form and upwardly opening of V shaped channel to receive L shape shear ties or fairing brackets. The surface of the top plate 36 and the upright face 40 of the rear wall 38 forms a reference surface against which the parts can be placed and positioned so they are always in the same orientation for gripping by the parts presentation module 30.

A slot 42, shown in FIGS. 1A and 2, is machined in the body 35, the lower surface of which is coplanar with the top surface of the top plate 36 for receiving a projecting leg of a T shape shear tie or fairing bracket. A notch 44 in the rear wall 38 provides an access opening for the robot end effector to grip the shear tie after it has been centered by the shear tie presentation module 30.

A cable cylinder assembly 46 such as a model S100-3/4 from Tol-O-Matic Co. in Minneapolis, Minn., is connected to the body 35 on the left hand side of the frame as shown in FIGS. 2 and 4. The cable cylinder assembly 46 includes an air cylinder 48 closed at both ends by closures 50 and 52. A seal 54 and 56 is secured at each end of the cylinder 48, respectively, for admitting passage of a vinal-coated cable 60 through the cylinder 48 while sealing air pressure within the cylinder. A piston 62 shown in FIGS. 5 and 6, is disposed in the cylinder 48 for axially travel there along and has an axial opening therethrough for receiving the cable 60. The cable is connected to the piston 62 in the axially opening so that the movement of the piston in the cylinder drives the cable 60 along its length. Connection of the cable 60 to the piston 62 at the axially centerline of the piston provides for a pure axial force along the length of the cable without exerting a twist or a moment on the cable.

A pulley 64 is mounted at the left hand end of the cable cylinder assembly 46. The pulley has a peripheral grove for receiving the cable where is exits the seal 54 at the bottom run of the cable 60. The pulley 64 conveys the cable 180° around to the top run where it terminates at a threaded fitting 66 secured to a carriage 68 as by swaging or the like.

The cable 60 exits the seal 56 at the right hand side of the cable cylinder assembly and passes around one of two grooves aligned with the exit hole in the seal 56 on a right hand pulley 70 on the cable cylinder 46. The cable 60 is conveyed around the pulley 70 and passes over the top of a second double grove pulley 72 to the top run of a right hand side cable loop, where it terminates in a threaded fitting 74 swaged onto the end of the cable 60. The threaded fitting 74 is attached to a right hand carriage 76 to be described below.

A threaded fitting 78 swaged onto one end of a second cable 80 connects the second cable to a right hand carriage 76. The cable passes over a single groove pulley 84 fastened to the body 35 at the right hand end of the frame 34 which reverses the direction of the cable 80 180° to a lower run of the right hand cable loop. At the left hand end of the bottom run of the right hand loop of cable, the cable 80 passes under the front groove of the pulley 72 and over the front groove in the pulley 70 to the top run of the left hand loop of the cable where it attaches to the other side of the carriage 68 by a threaded fitting 88 swaged onto the other end of the cable 80. This arrangement of two adjacent lopes of cable crossing at adjacent pulleys 70 and 72 in a FIG. 8 arrangement enables the carriages 68 and 76 to move in opposite directions when the piston 62 in the cable cylinder assembly 46 is driven by air pressure in the cylinder 48.

The two carriages 68 and 76 are connected to the top runs of the two loops of cable and are guided for precise linear motion toward and away from each other by linear bearings 90 and 92 fastened to the back side of the carriages 68 and 76 and engaged with rails 94 and 96 respectively. The front side of each carriage 68 and 76 is milled out to provide a recess 98 and 100 respectively having four holes drilled to receive screws 102 which hold the linear bearings 90 and 92 to the back side of the carriages 68 and 76 respectively. Longitudinal holes are drilled through the sides of the carriage body in line with the rails 94 and 96 to receive the threaded fittings 66 and 88 on the left hand carriage and the fittings 74 and 78 on the right hand carriage 76. Nuts are screwed on to the threaded fittings to secure the end of the cable to the carriages 68 and 76. Tension in the cable may be adjusted by adjusting the torque on the nuts threaded on to the threaded fittings at the ends of the cables 60 and 80. Alignment of the upper runs of the two loops of cable with the rails 94 and 96 ensure that no unbalanced forces will be exerted through the bearings on the rails 94 and 96 which could shorten their life.

Operation of the opposed motion FIG. 8 device describes thus far is as follows: Air pressure is delivered to the air cylinder 48 through and air fitting 110 having a flow control valve 112 for adjustment of the speed of operation of the piston in the cylinder 48. The air pressurizes the right hand side of the cylinder 48 and moves the piston 62 in to the left in FIGS. 2 and 6. The cable 60, attached to the piston 62, is driven by the piston axially along the air cylinder 48. Air in the left hand side of the cylinder 48 to the left of the piston 62 is expelled through a left hand air fitting 113 and exhausted through a muffler to the atmosphere. The clockwise motion of the cable around the left hand loop is reversed in the right hand loop because of the crossing of the cables around the pulleys 70 and 72. Thus the top run of the left loop of cable moves to the right when the piston 62 moves to the left and the cylinder 48, while the top run of the cable right hand loop moves to the left as the piston 62 moves to the left in the air cylinder 48.

When it is desired to move the carriages 68 and 76 apart, the air cylinder 48 is pressurized through the left hand fitting 113 to pressurize the air cylinder 48 on the left side of the piston 62, moving the piston 62 to the right in the air cylinder 48 and driving the bottom run of the cable 60 to the right with the piston 62. The left hand end of the cable 60, attached to the left side of the left carriage 68 is pulled to the left by the cable 62 and the right hand carriage 76 is pulled to the right by the right hand end of the second cable 80 at its attachment to the carriage 76 at the threaded fitting 78.

Cable cylinder assembly 46 has a longitudinal axis 114 that is set at a slight angle to the longitudinal access of the frame 34, as most clearly shown in FIG. 4, so that the line of action of the top run of the left hand loop of cable is parallel to the track 94 and exactly aligned with the offset rear groove in the pulley 70, The top run of the right hand loop of cable is arranged parallel with the track 96 and the bottom run of that right hand lope of cable, as shown in FIG.

4, extends at a slight angle to the longitudinal axis of the frame 34 to engage the front groove of the pulley 72 so that it is aligned with the front groove of the pulley 70 for its portion of the top run of the left hand loop of cable.

Two part grippers 120 and 122 are fastened to the top of the carriages 68 and 76 respectively. The two part gripper 120 and 122 are identical, apart from being mirror images of each other, so only one part gripper 120 will be described with the understanding that the same description applies to the other part gripper 122. The part gripper 120 includes a body 124 having a base portion 126 and an upstanding ear 128 on the top of the base 126. The inner surface of the upstanding ear 128 forms an upstanding abutment 129 which engages the end of the part when the part grippers close on the part. The right hand end of the base 126 facing the center of the frame 34 is beveled to provide a ramp surface 130 for purpose to be described.

A roller arm 132 in the form of an inverted U channel is pivotally connected to the ear 128 by a pivot pin 134. A roller 136 is mounted on the right hand end of the roller arm 132 and is positioned right above the ramp 130. The other end of the roller arm has a vertical hole to receive a vertical pin 138 which is threaded into a internally threaded hole in the base 126 and receives a compression spring which is compressed between the left hand end of the roller arm and a flat on the base 126. A nut and a jam nut pair 140 and 142 are threaded onto the upper end of the pin 138 to provide an adjustment of the low or ready position of the roller 136.

In operation, a part such as a shear tie or a fairing bracket is placed on the frame top plate 36 and is presence is detected by a proximity sensor 144 which signals to the robot control system that a part is present on the part presenter. The operator presses the start button to pressurize the gas cylinder 48 and move the piston 62 to the left in FIG. 5 driving the cable 60 in a clockwise direction. This pulls the carriage 76 to the left, pulling the cable 80 with it which pulls the carriage 68 to the right thus bringing the two carriages and their attached grippers together on the part. When the grippers 120 and 122 reach the part, the ramp surface 130 slides under the part and lifts it up the ramp 130. The rollers 136 on the gripper 120 and 122 hold the part down against the surface of the ramp 130 until the edge of the part reaches the facing abutment surface 129 of the ear 128 which halts the movement of the carriages toward the center of the frame. At this point the air pressure in the cylinder 48 exerts a biasing force on the carriages 68 and 76 to hold the abutment surfaces of the ears 128 against the edge of the part, and the roller 136 hold the part down against the inner section of the abutment and the ramp 130. The part is now held in a precisely center position on the parts presenter and a precisely elevated position for gripping by a robot end effector.

Turning now to FIG. 7, a stringer clip presentation module 32 is shown in FIG. 7. The module 32 repeatably presents stringer clips to a know position and orientation in space for pickup by an end effector such as the end effector in U.S. Pat. No. 5,127,139 for placement and drilling in a stringer.

The module 82 includes a body 150 having a recess 152 in which an air cylinder 154 is connected by screws 156. A piston 158 in the air cylinder 154 has a holder 160 mounted on the end of the piston and two spaced pins 162 are mounted in parallel spaced relationship in the holder 160. A spring 164 mounted on the end of the holder prevents the holder 160 from impacting against the end of the recess 152 at the end of the travel of the piston 158.

The pins 162 extend through aligned holes in the body 150 and communicate between the recess 152 and a forward recess in the body 150. Two pairs of rollers 166 and 168 are mounted in the forward recess on H-frames 170, each frame 170 supporting two rollers. A spring 172 compressed between a depression in the center of each H-frame and a tension adjusting screw 174 in the body 150 biases the rollers 166 and 168 to the right in FIG. 8 pushing the right hand leg 176 of a stringer clip 180 to the right against a reference surface of a longitudinal slot milled in the body 150 to receive the leg 176 of the stringer clip 180.

A large diameter narrow roller 182 is mounted on the outside edge of the body 150, as shown in FIGS. 7 and 9, on a roller arm 184. The roller arm 184 has a projection 186 on which the roller 182 is mounted and a second projection of equal size 188 by which the roller arm is pivotally mounted on the body 150 by a pivot pin 189. A lower extension 190 projects beyond the projection 188 to provide a lever arm for a spring 192 compressed between the body 150 and the extension 190 to bias the arm 184 counter clockwise about its mounting pivot in the projection 188 to bias the roller 182 to the left in FIG. 7 to bear against the web 194 of the stringer clip 180 to push the web against a reference surface in a slot milled in the body 150 to receive the stringer clip. Thus is can be seen, specially from FIG. 9, that the stringer clip 180 is pressed by the rollers 166 and 168 against one reference surface while the roller 182 presses the web 194 of the stringer clip against an orthogonal reference surface thereby precisely locating the stringer clip 180 precisely on a predetermined axis.

The position of the stringer clip 180 along its axis is determined by the position to which it is pushed by the air cylinder 154 acting through the holder 160 on the pins 162. The ends of the pins 162 bear against the end of the leg 176 of the stringer clip 180 and allow the pins 162 to push the stringer clip to the precisely desired longitudinal position when the stringer clip is to be picked up by the end effector. The bottom roller of each pair of rollers 166 and 168 has a groove, shown in FIG. 7, to permit the pin 162 to engage the end of the leg 176 of the stringer clip 180 without interfering of the roller.

A pair of sensors 196 and 198 are positioned in the body 150 to sense when a stringer has been inserted into its slot in the end of the body 150 and when it has been removed. A third sensor 200 is provided in the lower recess 152 to sense when the holder 160 has been extended fully to push the stringer clip 180 out into the jaws of the end effector.

Obviously, numerous modifications and variations of the preferred embodiment of the invention will occur to those skilled in the art in view of this disclosure. Accordingly, it is expressly to be understood that these variations and modifications, and the equivalents thereof, may be practiced while remaining within the spirit and scope of the claims, wherein I claim:

1. An apparatus for accurately positioning parts precisely in a predetermined location, comprising:

a frame having a pan receiving zone on which said pans are placed and a plurality of pulleys mounted on said frame;

a cable trained around said pulleys;

two positioners mounted on said frame and connected to said cable for opposed motion toward and away from said part receiving zone under control of said cable; and a motive device coupled to said cable and operative to move said cable in one direction to move said positioners toward each other to center said part, and in the opposite direction to move said positioners away form each other to release said part, said motive device including an air cylinder coupled to said cable, said air cylinder including a piston connected to said cable and said cable extending through said cylinder and through seals at both ends of said cylinder.

2. An apparatus as defined in claim 1, wherein:

said plurality of pulleys include four pulleys in a linear arrangement, and wherein said cable is arranged around said four pulleys in two adjacent loops in a figure "8" configuration, each loop being arranged around two of said four pulleys and having an upper run and a lower run; and each of said positioners is connected to said cable on the same run of each of said loops.

3. An apparatus as defined in claim 1, further comprising:

connectors for connecting said cable to said positioners; and a guide means connected to each of said positioners and to said frame for guiding said positioners along a predetermined path toward and away from said part.

4. An apparatus as defined in claim 3, wherein:

said guide means includes a linear bearing attached to each of said positioners, and a rail fastened to said frame with which each of said linear bearings is engaged.

5. An apparatus as defined in claim 4, wherein: said plurality of pulleys include four pulleys in a linear arrangement, and wherein said cable is arranged around said four pulleys in two adjacent loops in a figure "8" configuration, each loop being arranged around two of said four pulleys and having an upper run and a lower run;

each of said positioners is connected to said cable on an upper run of each of said loops; and said air cylinder is at a slight angle to said rail to enable said upper run of each of said loops to lie parallel to said rail.

6. An apparatus as defined in claim 1, wherein:

said positioners each include a roller on the end of a spring loaded arm pinned to a base having a ramp surface ending in an abutting surface facing said receiving zone, with said roller positioned over said ramp surface;

whereby, when said positioners close on said part, said ramp surfaces cam said part up off said receiving zone to a reference position centered between said abutting surfaces, and said rollers hold said part down against said ramp surfaces while said air cylinder holds said abutting surfaces against said part, thereby centering said part between said abutting surfaces.

7. A method of accurately positioning parts precisely in a predetermined location and orientation, comprising:

placing a part against a reference surface on a base;

energizing an actuator to move a cable in one direction along its length around a plurality of pulleys;

moving a pair of positioners in opposite directions toward said part attached to said cable, by moving said cable;

engaging opposite sides of said part with said positioners and camming said part up along a ramp surface on each of said positioners and engaging opposite ends of said part with an abutment on each of said positioners to lift said part to a reference position and center said part between said positioners;

gripping said part while in said centered position; and energizing said actuator to move said cable along its length, in the direction opposite said one direction, to move said positioners apart and release said part.

8. A method as defined in claim 7, wherein said gripping comprises:

holding said part down against said ramp surface and holding said abutments against said opposite ends of said part with a biasing force to prevent inadvertent movement away from said predetermined location and orientation.

9. A method as defined in claim 7, wherein:

said energizing includes applying air pressure on one side of an air piston in a cylinder; and exerting force on said cable with said piston.

10. A method as defined in claim 9, wherein:

exerting said force by said piston on said cable axially along said cable by a connection of said cable to said piston at the axial center of said piston.

11. A method as defined in claim 7, wherein said energizing includes the step of:

moving said cable along a figure-8 path of travel around said pulleys.

12. A cable-operated opposed motion device, comprising:

a cable actuator attached to a base, said cable actuator having a cylinder and a piston disposed coaxially in said cylinder; a first pair of pulleys, one at each end of said cylinder; and a cable trained around both pulleys and connected to said piston along said axial center of said piston;

a second pair of pulleys attached to said base approximately in line with said first pair of pulleys;

said cable trained around both pulleys of said second pair and crossed between said two pairs of pulleys in a FIG. 8 configuration;

two carriages, one each connected to the same run of cable between said first and second pair of pulleys;

whereby pressurizing said cylinder on one side of said piston moves said piston and said cable in one direction axially in said cylinder, moving said carriages toward each other; and pressurizing said cylinder on the other side of said piston moves said piston and said cable in the opposite direction axially in said cylinder, moving said carriages away from each other.

* * * * *